UNITED STATES PATENT OFFICE.

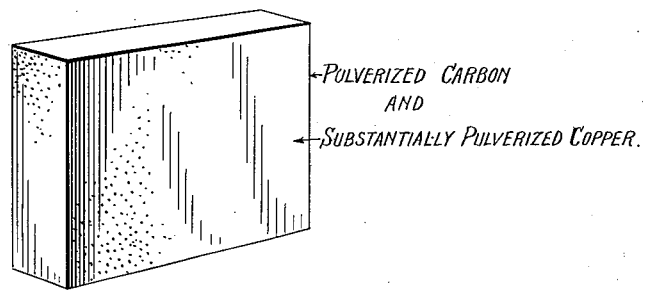

WILLIAM DEATS AND CAMPBELL SCOTT, OF YONKERS, NEW YORK, ASSIGNORS TO NATIONAL CARBON COMPANY, OF CLEVELAND, OHIO, A CORPORATION OF NEW JERSEY.

PROCESS OF MAKING ELECTRICAL CONDUCTORS.

1,067,003.  Specification of Letters Patent.  Patented July 8, 1913.

Application filed August 16, 1909. Serial No. 513,038.

*To all whom it may concern:*

Be it known that we, WILLIAM DEATS and CAMPBELL SCOTT, citizens of the United States, and residents of Yonkers, in the county of Westchester and State of New York, have invented a certain new and useful Improvement in Processes of Making Electrical Conductors, of which the following is a full, clear, and exact description.

The object of this invention is to produce compressed blocks of intimately mixed carbon and metal or metals.

The invention consists first in the hereinafter described blocks of intimately mixed pulverulent carbon and metal or metals; and second, the hereinafter described process of making the same.

The term carbon as herein used is inclusive of ordinary carbon and graphite and of the various intermediate polymerized forms of carbon. The term metal herein used is inclusive of all metals which may be combined with carbon in substantially the manner and with substantially the useful results hereinafter set forth. In our work, however, we have only used copper and a mixture of copper and zinc, because copper and brass have higher electrical conductivity than any other metals which are cheap enough to make their commercial use possible. The blocks referred to when completed are intended primarily for use as electrical conductors, and particularly for such electrical conductors as are commonly known as electrical brushes. The blocks, however, have certain other uses particularly as bearings where the pressure is not too great. The blocks are strong and durable, have great electrical conducting powers and greater heat dissipating powers than either carbon or graphite, and low coefficient of friction.

The accompanying drawing is a perspective view of an electrical brush made by our process.

In preparing the blocks it is first necessary to reduce the carbon to a finely pulverulent condition, which result may be effected in any suitable manner. It is also necessary to reduce the metal or metals to be employed to like condition. Finely powdered or pulverulent metal suitable for use may be obtained by precipitating the metal from a metallic salts solution, the method of procedure being well understood. In the case of some metals they may be pulverized by grinding, as for example, in a ball mill. We have invented a process of producing suitable finely powdered copper which is the subject of an application for a patent filed contemporaneously with this application. It is, however, a matter of no consequence whatever in connection with the present invention as to how the metal is reduced to the necessary finely pulverulent condition.

What metals shall be used, and what molecular form of carbon shall be used, and the proportions in which they shall be used all depend upon the uses to which the completed blocks are to be put. To make blocks having very high conductivity and therefore especially adapted for use as brushes for A. C. motors or low voltage plating dynamos, a mixture of about ten parts copper to one part graphite, by weight, is thought to be best.

For controller contacts a very satisfactory mixture is eight parts copper, two parts zinc (in the form of flour of zinc) and one part graphite. For contacts subject to heavy arcing and when high conductivity is not necessary, a larger proportion of graphite and less copper is desired. It is thought that the best results are obtained by a mixture of seven parts copper, two parts zinc and two parts graphite. To make blocks best suited for bearings the mixture should contain about seven parts copper and two parts zinc, and as large a proportion of graphite as is consistent with the required strength.

In making the mixtures of the finely pulverulent metal and graphite or other form of carbon, care should be taken to have the finely powdered metal or metals as completely deoxidized as possible. The ingredients must be thoroughly mixed together. The mixture is then formed by compression into blocks of the required size and shape. This result can best be obtained by pressure in suitable molds from a plunger, the pressure being preferably from 25 to 35 tons per square inch.

The blocks so produced are useful in many situations where great strength is not essential. For most uses, however, the blocks require subsequent treatment as follows: They are removed from the mold and slowly heated to a bright red heat, about 1500 degrees Fahrenheit. The heat should be near to but should not exceed the fusion temperature of the metal employed. Nevertheless, as a result of this treating, which should be continued about fifteen minutes, more or less, the minute particles of the metal which are in intimate contact with the minute particles of carbon become welded together and embrace the carbon particles. After the block has been so subjected to this heat for about the time specified the block is allowed to cool slowly. The thin film of oxid remaining on the surface should be removed by crocus cloth, buffing, or a quick immersion in hydrochloric acid, etc.

Having described our invention, we claim:—

The herein described process, which consists of mixing together finely pulverized carbon and substantially powdered metallic copper in a finely divided state, and subjecting the mixture to a high pressure to form a solid block and then baking the block.

In testimony whereof, we hereunto affix our signatures in the presence of two witnesses.

WILLIAM DEATS.
CAMPBELL SCOTT.

Witnesses:
MABEL E. SHERRY,
WALTER O. MOYER.